(12) United States Patent
Liang et al.

(10) Patent No.: US 12,472,985 B2
(45) Date of Patent: Nov. 18, 2025

(54) VEHICLE CONTROL METHOD AND APPARATUS, DEVICE, STORAGE MEDIUM AND AUTONOMOUS VEHICLE

(71) Applicant: APOLLO INTELLIGENT DRIVING TECHNOLOGY (BEIJING) CO., LTD., Beijing (CN)

(72) Inventors: Qi Liang, Beijing (CN); Yinong Tan, Beijing (CN); Zhengyu Liu, Beijing (CN); Liutao Li, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 319 days.

(21) Appl. No.: 18/112,475

(22) Filed: Feb. 21, 2023

(65) Prior Publication Data
US 2023/0278590 A1 Sep. 7, 2023

(30) Foreign Application Priority Data
Mar. 4, 2022 (CN) .......................... 202210208751.7

(51) Int. Cl.
*B60W 50/00* (2006.01)
*B60W 50/02* (2012.01)
(Continued)

(52) U.S. Cl.
CPC .... *B60W 60/0018* (2020.02); *B60W 50/0205* (2013.01); *G06N 3/08* (2013.01); *B60W 2050/0075* (2013.01)

(58) Field of Classification Search
CPC ......... B60W 60/0018; B60W 50/0205; B60W 2050/0075; B60W 50/00; B60W 60/001;
(Continued)

(56) References Cited

U.S. PATENT DOCUMENTS

2014/0136455 A1* 5/2014 Cheng .................. G05B 15/02
700/20
2021/0402898 A1* 12/2021 Alvarez ................. B60N 2/501

FOREIGN PATENT DOCUMENTS

CN 104279069 A 1/2015
CN 107264534 A 10/2017
(Continued)

OTHER PUBLICATIONS

"Diandong Qiche", 3rd edition, Hua Hu, Hui Song; China Communication Press, Jan. 2012, pp. 292-298.
(Continued)

*Primary Examiner* — Shardul D Patel
(74) *Attorney, Agent, or Firm* — Ladas & Parry, LLP

(57) ABSTRACT

A vehicle control technical solution is provided. The solution relates to the field of computer technologies, and particularly to the field of artificial intelligence technologies, such as autonomous driving technologies, intelligent transportation technologies. A vehicle control method includes: acquiring a state quantity error between a desired state quantity at a current moment and a real state quantity at a previous moment of a vehicle; determining a control quantity of the vehicle at the current moment based on the state quantity error and a mapping relationship between the control quantity of the vehicle and the state quantity error; and controlling a driving behavior of the vehicle based on the control quantity at the current moment to obtain a real state quantity at the current moment.

5 Claims, 7 Drawing Sheets

(51) Int. Cl.
  *B60W 60/00* (2020.01)
  *G06N 3/08* (2023.01)
(58) Field of Classification Search
  CPC . B60W 2050/0043; G06N 3/08; G06N 3/048; G06N 3/0499; B60T 2260/06; B60T 17/22; Y02T 10/40; G05D 1/0221
  USPC .......................................................... 701/23
  See application file for complete search history.

(56) References Cited

FOREIGN PATENT DOCUMENTS

| | | | | |
|---|---|---|---|---|
| CN | 113085858 A | * | 7/2021 | .......... B60W 30/143 |
| CN | 113183975 A | | 7/2021 | |
| CN | 113734182 A | | 12/2021 | |
| CN | 113741199 A | | 12/2021 | |
| JP | H08-35913 A | | 2/1996 | |
| JP | 3032683 B2 | | 4/2000 | |
| JP | 2019-113926 A | | 7/2019 | |

OTHER PUBLICATIONS

First Office Action(OA) and search report dated Aug. 2, 2022 for Chinese Patent Application No. 202210208751.7 and its English translation from Global Dossier.

Second Office Action(OA) dated Oct. 19, 2022 for Chinese Patent Application No. 202210208751.7 and its English translation from Global Dossier.

Notice of Allowance (NOA) and search report dated Jan. 16, 2023 for Chinese Patent Application No. 202210208751.7 and its English machine translation by Google Translate.

Zhu, Maofei et al., Vehicle Chassis Decoupling Control Based on Neural Network Inverse Method, Transactions of the Chinese Society for Agricultural Machinery, vol. 42, No. 12 , Dec. 2011, pp. 5, 13-17.

Extended European Search Report for the corresponding European Patent Application No. 23157664.6 issued by the European Patent Office on Aug. 11, 2023.

\* cited by examiner

VEHICLE CONTROL METHOD AND APPARATUS, DEVICE, STORAGE MEDIUM AND AUTONOMOUS VEHICLE

The present disclosure claims the priority and benefit of Chinese Patent Application No. 202210208751.7, filed on Mar. 4, 2022, entitled "VEHICLE CONTROL METHOD AND APPARATUS, DEVICE, STORAGE MEDIUM AND AUTONOMOUS VEHICLE". The disclosure of the above application is incorporated herein by reference in its entirety.

TECHNICAL FIELD

The present disclosure relates to the field of computer technologies, particularly to the field of artificial intelligence technologies, such as autonomous driving technologies, intelligent transportation technologies, and more particularly to a vehicle control method and apparatus, a device, a storage medium and an autonomous vehicle.

BACKGROUND

An autonomous vehicle or self-driving automobile, also called an unmanned vehicle, a computer-driven vehicle or a wheeled mobile robot, is an intelligent vehicle using a computer system to realize an unmanned driving operation.

A chassis system of the autonomous vehicle may perform corresponding operations based on a control quantity output by a vehicle controller. A state quantity corresponding to the control quantity output by the vehicle controller may be referred to as a desired state quantity. The chassis system may perform the corresponding operations based on the control quantity and output a real state quantity.

In some cases, a model corresponding to performance of the corresponding operations by the chassis system, such as a braking model, may have uncertainty, and this uncertainty may cause a larger error between the real state quantity and the desired state quantity, which may cause unstable driving of a vehicle, and further affect driving safety, user experience, or the like.

SUMMARY

The present disclosure provides a vehicle control method, a device, and an autonomous vehicle.

According to one aspect of the present disclosure, there is provided a vehicle control method, including: acquiring a state quantity error between a desired state quantity at a current moment and a real state quantity at a previous moment of a vehicle; determining a control quantity of the vehicle at the current moment based on the state quantity error and a mapping relationship between the control quantity of the vehicle and the state quantity error; and controlling a driving behavior of the vehicle based on the control quantity at the current moment to obtain a real state quantity at the current moment.

According to another aspect of the present disclosure, there is provided an electronic device, including: at least one processor; and a memory connected with the at least one processor communicatively, where the memory stores instructions executable by the at least one processor to enable the at least one processor to perform the method according to any one of the above-mentioned aspects.

According to another aspect of the present disclosure, there is provided an autonomous vehicle, including a vehicle controller, configured for outputting a desired state quantity at a current moment; a chassis system, configured for outputting a real state quantity at a previous moment; and an adaptive control module, configured for acquiring a state quantity error between the desired state quantity at the current moment and the real state quantity at the previous moment, and determining a control quantity of the vehicle at the current moment based on the state quantity error and a mapping relationship between the control quantity of the vehicle and the state quantity error, and outputting the control quantity of the vehicle to the chassis system, where the chassis system controls the driving behavior of the vehicle based on the control quantity at the current moment to obtain the real state quantity at the current moment.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION OF EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

A chassis system is a combination of four parts of a transmission system, a running system, a steering system and a braking system on a vehicle, supports and mounts an engine and components and assemblies thereof to form an integral shape of the vehicle, bears power of the engine, and guarantees normal running.

Taking a braking operation as an example, a vehicle controller may acquire a desired state quantity based on a model or not based on the model, and the chassis system may perform the braking operation based on an input control quantity (such as the desired state quantity), and outputs a real state quantity. The desired state quantity and the real state quantity may be desired acceleration and real acceleration respectively, and the control quantity is, for example, an accelerator opening degree.

The chassis system may perform the braking operation based on a braking model, and the braking model reflects a relationship between an input quantity (such as a control quantity) and an output quantity (such as a state quantity).

For an electric vehicle with an energy recovery function, when the energy recovery function is started, the braking model of the chassis system has uncertainty, such as: a type of the switched braking model is uncertain; that is, the braking model may be a motor braking model or a mechanical braking model; switching time is uncertain; and model parameters of the switched motor braking model or mechanical braking model are uncertain.

Due to the uncertainty of the braking model, fluctuation exists in the real acceleration output by the chassis system, and a great difference may exist between the real acceleration and the desired acceleration output by the vehicle controller, which may cause unnecessary emergency braking, resulting in unstable driving of the vehicle, thus affecting driving safety, user experience, or the like.

In order to improve a vehicle control effect and then guarantee stable running of the vehicle, for example, avoid unnecessary emergency braking, and guarantee the driving safety and user experience, the present disclosure may provide the following embodiments.

Figure 1:
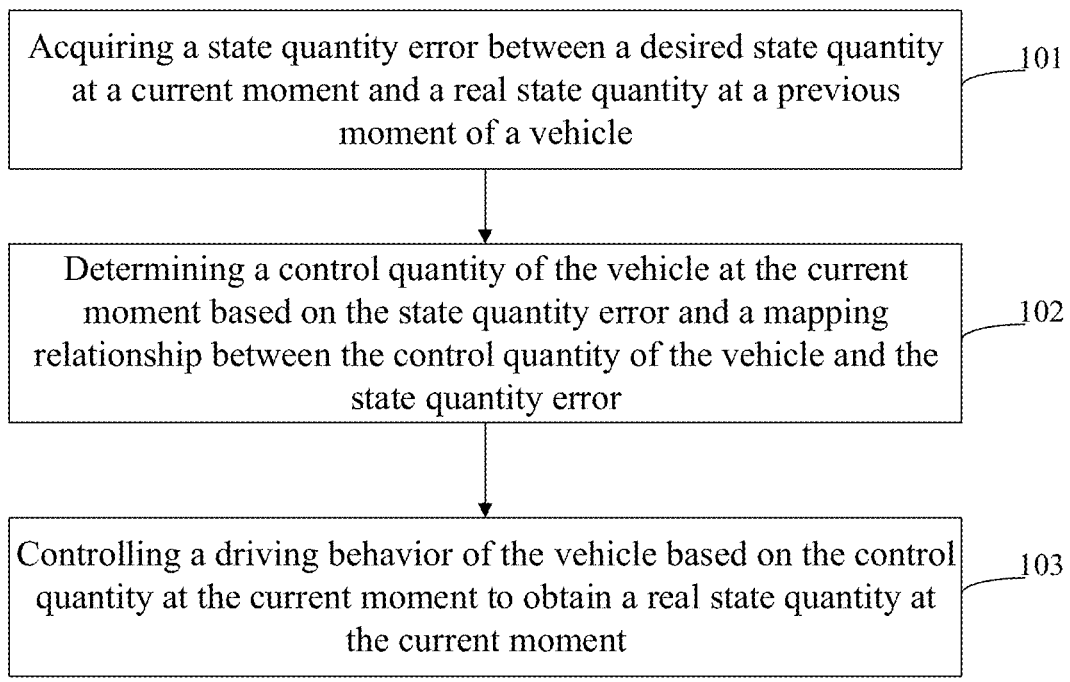
FIG. 1 is a schematic diagram according to a first embodiment of the present disclosure.

FIG. 1 is a schematic diagram according to a first embodiment of the present disclosure, and this embodiment provides a vehicle control method, including:

101: acquiring a state quantity error between a desired state quantity at a current moment and a real state quantity at a previous moment of a vehicle.

102: determining a control quantity of the vehicle at the current moment based on the state quantity error and a mapping relationship between the control quantity of the vehicle and the state quantity error.

103: controlling a driving behavior of the vehicle based on the control quantity at the current moment to obtain a real state quantity at the current moment.

In order to better understand the embodiments of the present disclosure, for example, an application scenario is described by taking an autonomous vehicle as the vehicle.

Figure 2:
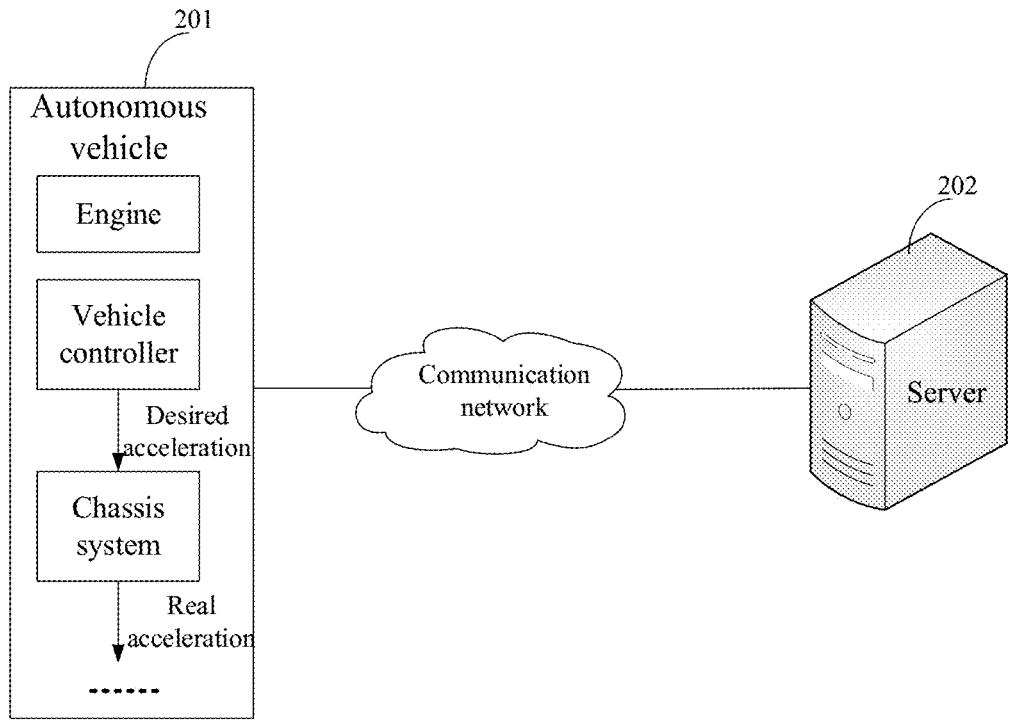
FIG. 2 is a schematic diagram according to a second embodiment of the present disclosure.

As shown in FIG. 2, a device involved in an autonomous driving scenario includes: an autonomous vehicle 201 and a server 202, the autonomous vehicle 201 may be connected with the server 202 by a communication network which may be a wireless communication network and/or a wired communication network, communication of the wireless communication network is performed using, for example, signals provided by a base station, and communication of the wired communication network is performed through, for example, an optical fiber, or the like. In addition, a satellite (not shown) may also be included in the autonomous driving scenario to achieve accurate positioning of the autonomous vehicle. The server 202 may be a local server or a cloud server corresponding to the autonomous vehicle.

The autonomous vehicle 201 may include: an engine, a vehicle controller, a chassis system, or the like. The engine is configured to provide a power source, and may be various gasoline engines, diesel engines, electric engines, or the like.

The vehicle controller is configured to generate control instructions to control the driving behavior of the vehicle. The vehicle controller may include a microcomputer, a ROM, a RAM, peripheral circuits, I/O interfaces, various drivers, or the like.

A chassis system is a combination of four parts of a transmission system, a running system, a steering system and a braking system on a vehicle, supports and mounts an engine and components and assemblies thereof to form an integral shape of the vehicle, bears power of the engine, and guarantees normal running. The transmission system is mainly composed of a clutch, a transmission, a universal transmission apparatus, a main retarder, a differential mechanism, a semiaxle, or the like; the running system is mainly composed of a frame, an axle, wheels, a suspension, or the like, of an automobile; the steering system is mainly composed of a steering wheel, a steering shaft, a steering column, a steering gear, a steering transmission mechanism, or the like; the braking system may be divided into a service braking system, a parking braking system, an emergency braking system, an auxiliary braking system, or the like.

The vehicle controller may transmit a control quantity to the chassis system, and the chassis system performs a corresponding operation based on the control quantity, and outputs a state quantity.

The control quantity is a physical quantity for describing a control signal, such as an accelerator opening degree, a voltage, or the like.

The state quantity is a physical quantity for describing a state of a controlled object, such as a position, a speed, acceleration, or the like.

The state quantity corresponding to the control quantity determined by the vehicle controller may be referred to as a desired state quantity.

In practical applications, the vehicle controller may also call a state quantity interface of the chassis system; that is, the vehicle controller may input the desired state quantity to the chassis system; at this point, the desired state quantity may be considered as the control quantity, and the state quantity output by the chassis system may be referred to as a real state quantity.

For example, the vehicle controller performs control using the state quantity, and the state quantity is acceleration, and as shown in FIG. 2, the acceleration output by the vehicle controller may be referred to as desired acceleration, and the desired acceleration is taken as an input of the chassis system; the chassis system may perform the corresponding operation, for example, a braking operation, based on the input desired acceleration; after the chassis system performs the braking operation, the acceleration output by the chassis system may be referred to as real acceleration.

The mapping relationship between the control quantity and the state quantity error may be in a functional form, a table form, or the like, which is not limited in the present disclosure.

Taking the functional form as an example, the above-mentioned mapping relationship may be referred to as a model specifically. Taking the braking operation as an example, the model may be referred to as a braking model specifically.

Taking an electric vehicle as an example, the braking model may include: a motor braking model and a mechanical braking model. The model is formulated as:

the motor braking model:

$$\dot{x} = -\frac{1}{T}x_1 + \frac{1}{T}u$$

the mechanical braking model:

$$\dot{x} = x_2$$

$$\ddot{x} = -2d\omega x_1 - \omega^2 + \omega^2 u$$

where $x_1 = \text{acc\_output}(t) - \text{acc\_real}(t-1)$ where acc_output(t) is the desired acceleration at the current moment, acc_real(t−1) is the real acceleration at the previous moment of the current moment, and u is the control quantity at the current moment. T, d and ω are model parameters of the braking model. $\dot{x}$ is a differential operation of $x_1$.

In the embodiments of the present disclosure, same or similar operational symbols represent same or similar meanings.

For an electric vehicle with an energy recovery function, when the energy recovery function is started, the braking model of the chassis system has uncertainty, and the uncertainty shows that: the switched braking model is uncertain; that is, the braking model may be the motor braking model or the mechanical braking model;

switching time is uncertain; and the model parameters (for example, T, d and ω) of the switched motor braking model or mechanical braking model are uncertain.

Figure 3:
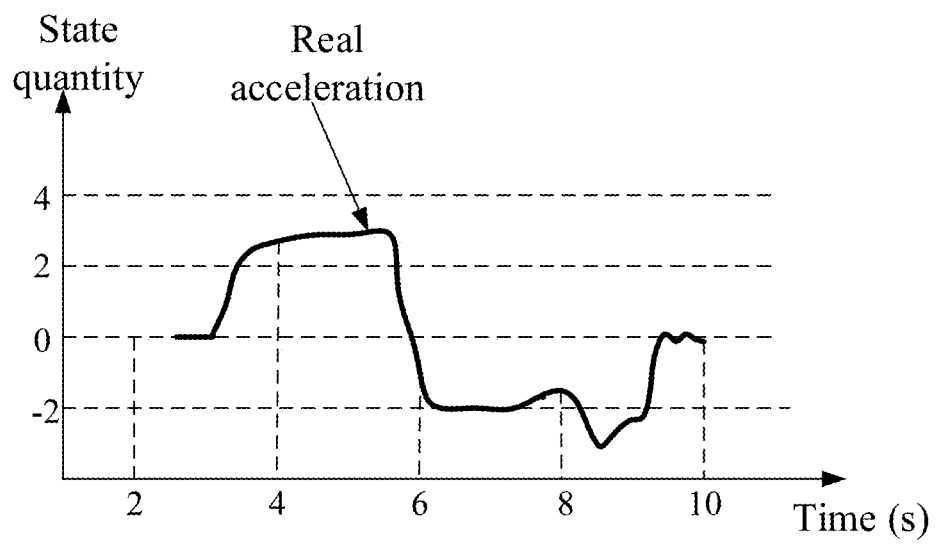
FIG. 3 is a schematic diagram of real acceleration fluctuation in a related art.

Due to the uncertainty of the braking model, fluctuation may exist in the real acceleration output by the chassis system; for example, referring to FIG. 3, when the desired acceleration changes from 3 m/s² to −2 m/s², the braking model is switched around the 8th second, and the real acceleration at this point has obvious acceleration fluctuation which may affect a speed error and an acceleration error, thereby causing unstable driving.

It may be understood that the above-mentioned scenario descriptions are only exemplary descriptions for facilitating understanding of the embodiment of the present disclosure, and the implementation of the embodiment of the present disclosure is not limited to the above-mentioned scenario, and may be applied to any applicable scenario.

In conjunction with the above scenario example, the vehicle control method according to this embodiment is described as follows.

The vehicle may be an autonomous vehicle specifically, and further, may be an electric autonomous vehicle.

The control quantity refers to the control quantity output by the vehicle controller, for example, the accelerator opening degree.

The desired state quantity refers to the state quantity corresponding to the control quantity, for example, the desired acceleration.

A known corresponding relationship may exist between the control quantity and the state quantity error, i.e., the mapping relationship between the control quantity and the state quantity error, such as the braking model, such that the desired state quantity may be acquired based on the control quantity.

The real state quantity refers to the state quantity (for example, the real acceleration) output by the controlled object, such as the chassis system of the vehicle.

In the embodiment of the present disclosure, for example, the desired state quantity is the desired acceleration, the real state quantity is the real acceleration, the controlled object is the chassis system, and the vehicle controller outputs the desired state quantity to the chassis system, unless otherwise specified.

The vehicle controller may determine and output the control quantity (such as the desired state quantity) based on the model or not based on the model.

For example, if determined based on the model, the desired state quantity may be determined based on model predictive control (MPC).

Figure 4:
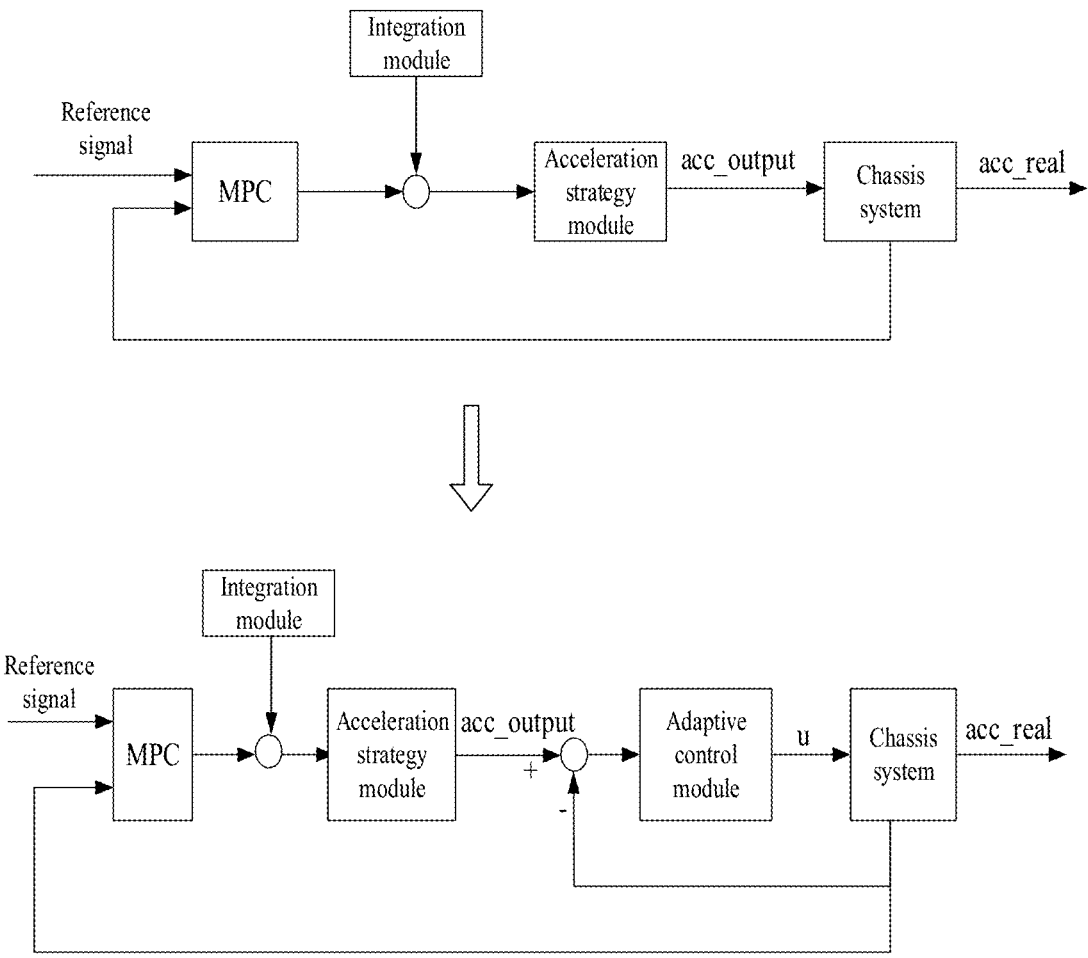
FIG. 4 is a schematic diagram of a system structure comparison between the related art and a third embodiment of the present disclosure.

For example, the desired acceleration is determined based on the MPC, and as shown on the upper side of FIG. 4, the vehicle controller may output desired acceleration acc_ouput by an acceleration strategy module based on the MPC, and specifically, desired acceleration acc_output may be obtained based on related technologies, such as a reference signal, an output signal of an integration module, or the like. The desired acceleration is input into the chassis system which outputs real acceleration acc_real.

The chassis system may control the driving behavior of the vehicle after receiving the desired acceleration, for example, performs the braking operation based on the desired acceleration. Taking the braking operation as an example, the real acceleration and the desired acceleration satisfy the relationship of the braking model.

For the electric vehicle with the energy recovery function, when the energy recovery function is started, the braking model of the chassis system has the uncertainty, which may cause fluctuation in the real acceleration; for example, the fluctuation exists around the 8th second as shown in FIG. 3, which may cause unnecessary emergency braking, and affect stable driving of the vehicle, or the like; that is, if a structure shown on the upper side of FIG. 4 is used for vehicle control, a vehicle control effect is not ideal.

In order to improve the vehicle control effect, in this embodiment, as shown on the lower side of FIG. 4, an acceleration closed loop is introduced newly. That is, real state quantity acc_real output by the chassis system is input into an adaptive control module as a feedback signal, another input of the adaptive control module is desired state quantity acc_output, and an output of the adaptive control module is control quantity u.

The MPC, the integration module and the acceleration strategy module may be located in the vehicle controller, and the adaptive control module may be located in the vehicle controller or the chassis system, or provided outside the vehicle controller and the chassis system as an independent module.

In this embodiment, the control quantity at the current moment is determined based on the state quantity error between the desired state quantity at the current moment and the real state quantity at the previous moment and the mapping relationship between the control quantity of the vehicle and the state quantity error, and since the real state quantity at the previous moment is introduced in the determination process of the control quantity, that is, the real state quantity may be used as the feedback signal to determine the control quantity, adaptive control over the control quantity may be realized, and fluctuation of the real state quantity is avoided, thereby guaranteeing driving stability, driving safety and user experience, and improving the vehicle control effect.

Figure 5:
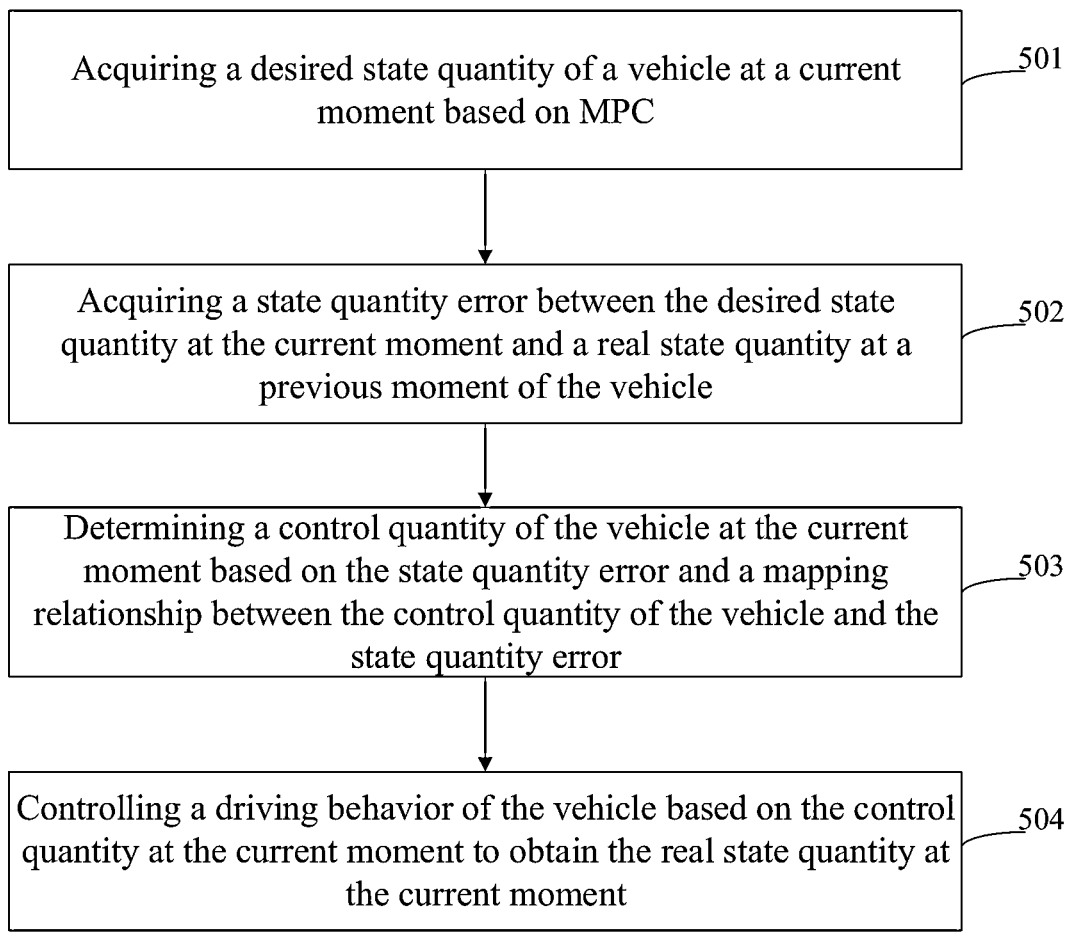
FIG. 5 is a schematic diagram according to a fourth embodiment of the present disclosure.

FIG. 5 is a schematic diagram according to a fourth embodiment of the present disclosure, and this embodiment provides a vehicle control method. In this embodiment, for example, the state quantity is acceleration, and referring to the structure diagram of FIG. 4, the vehicle control method according to this embodiment includes:

501: acquiring a desired state quantity of a vehicle at a current moment based on MPC.

As shown in FIG. 4, the desired state quantity is represented by acc_output.

The desired state quantity may be obtained by a reference signal, the MPC, an integration module, and an acceleration strategy model, and for details, reference may be made to the related art, which will not be described in detail herein.

502: acquiring a state quantity error between the desired state quantity at the current moment and a real state quantity at a previous moment of the vehicle.

As shown in FIG. 4, the real state quantity is represented by acc_real.

As shown in the lower structure diagram of FIG. 4, the desired state quantity is used as one input of an adaptive control module, and the other input of the adaptive control module is the real state quantity; that is, the real state quantity is input into the adaptive control module as a feedback signal.

Considering a processing procedure of the feedback signal, for a certain moment, the two input signals at the moment include: the desired state quantity at the moment and the real state quantity at a previous moment of the moment.

In view of versatility, the certain moment may be represented by the current moment.

A calculation formula of the state quantity error may be represented as:

state quantity error($t$)=desired state quantity($t$)−real state quantity($t-1$).

The state quantity error ($t$) is a state quantity error at the current moment, the desired state quantity ($t$) is the desired state quantity at the current moment, and the real state quantity ($t-1$) is the real state quantity at the previous moment.

For simplicity of description, for example, the state quantity is acceleration, and with reference to FIG. 4, a calculation formula of an acceleration error may be simplified as:

$x_1$=acc_output−acc_real, where acc_output is desired acceleration at the current moment, acc_real is real acceleration at the previous moment, and $x_1$ is the acceleration error between the desired acceleration at the current moment and the real acceleration at the previous moment.

503: determining a control quantity of the vehicle at the current moment based on the state quantity error and a mapping relationship between the control quantity of the vehicle and the state quantity error.

The mapping relationship between the control quantity of the vehicle and the state quantity error may be in a model form, and the model may be a corresponding control model based on different to-be-controlled driving behaviors.

For example, the to-be-controlled driving behavior is a braking operation, and the control model may be referred to as a braking model. Further, a real control operation may be control over a chassis system of the vehicle, and therefore, the braking model may be a braking model of the chassis system specifically.

Therefore, the mapping relationship between the control quantity of the vehicle and the state quantity error may be the braking model of the chassis system specifically.

For an electric vehicle with an energy recovery function, when the energy recovery function is started, the braking model of the chassis system has uncertainty; for example, a type of the model (a motor braking model or a mechanical braking model), parameters of the model, switching time of the model type, or the like, are uncertain.

The braking model in a form of a second order function may be represented as:

$$\dot{x}_1 = x_2$$

$$x_2 = f(x_1, x_2) + bu$$

where $f(x_1, x_2)$ is a function with the state quantity of the vehicle an independent variable, and implies an uncertainty function of type switching of the braking model and parameter variations, and both the motor braking model and the mechanical braking model may be approximated by the function. u is the control quantity, and b is a preset parameter.

$f(x_1, x_2)$ may be parametrically linearized, that is, is used for a neural network approximating an unknown function (such as the braking model).

The neural network may be a multilayer perceptron network specifically, and plays a role of a function approximator in adaptive control.

Figure 6:
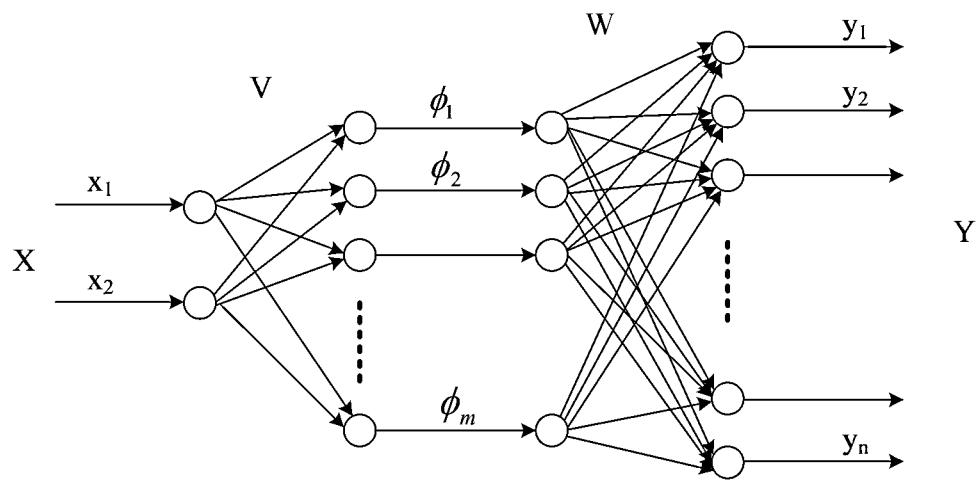
FIG. 6 is a schematic diagram according to a fifth embodiment of the present disclosure.

The neural network is shown in FIG. 6.

As shown in FIG. 6, V and W are model parameters, and may approximate model parameters of the braking model specifically. $\phi_1 \sim \phi_m$ are activation functions in the neural network, such as a tanh function, a sigmoid function, or the like.

X is input data of the neural network, and in this embodiment, $X=[x_1, x_2]^T$;

$x_1$ and $x_2$ are the above acceleration error and a differential of the acceleration error respectively; T is a transposition operation.

Y is output data of X through the neural network, and is represented by the formula:

$$Y = W^T \phi(V^T X)$$

In the related art, as shown in the upper structure of FIG. 4, the chassis system is directly controlled with the desired state quantity, and the braking model is not considered.

However, in this embodiment, the braking model of the chassis system is considered when the control quantity is determined; that is, the control quantity is determined based on the state quantity error and the above-mentioned mapping relationship (such as the braking model).

As shown in the lower structure of FIG. 4, the control quantity may be determined and output by the adaptive control module based on the above-mentioned state quantity error and the braking model approximated by the neural network.

In some embodiments, the determining a control quantity of the vehicle at the current moment based on the state quantity error and a mapping relationship between the control quantity of the vehicle and the state quantity error includes: determining a filtering error and input data based on the state quantity error; processing the input data using a neural network model at the current moment to obtain output data; and determining the control quantity of the vehicle at the current moment based on the filtering error and the output data.

That is, the braking model may be approximated with the neural network, and then, the control quantity is determined based on the neural network.

In some embodiments, the method further includes: updating the neural network model at the previous moment based on the filtering error to determine the neural network model at the current moment.

That is, the neural network may be updated online.

In some embodiments, model parameters of the neural network model include a first parameter and a second parameter, the first parameter is a fixed value, and the second parameter is an updatable parameter; the updating the neural network model at the previous moment based on the filtering error to determine the neural network model at the current moment includes: updating the second parameter at the previous moment based on the filtering error to determine the second parameter at the current moment.

The first parameter may be represented by V, the second parameter may be represented by W, and the model update may specifically mean that W is updated while V is kept unchanged.

Specifically, the control quantity is determined based on the neural network and the acceleration error, and an update process of the neural network may be as follows.

The adaptive control module may determine the control quantity and update the model according to a control law and an update law. The control law and the update law may be pre-configured to the adaptive control module. Expressions for the control law and the update law may be as follows:

the control law:

$$u = -ks - \hat{W}^T \phi(V^T X)$$

the update law:

$$\dot{\hat{W}} = l(s\phi(V^T X) - \tau \hat{W})$$

where s is the filtering error which may be determined based on the state quantity error (such as the acceleration error), and a calculation formula is: $s = x_2 + \lambda x_1$; k, l, τ is a preset parameter, and generally, k>0, l>0, τ>0. $\hat{W}$ is updated W.

For the model parameters (W, V), V may be fixed, and W is updatable and is updated W; that is, W may be updated according to the above update law.

During initialization, V may be selected randomly; W is initialized to a set value, such as an all 0 value.

According to theoretical proof, based on the above-mentioned control law and update law, a control objective of $$\lim_{t \to \infty} x_1 = 0$$

may be achieved.

Therefore, based on the above-mentioned control law and update law, the adaptive control module may determine control quantity u at the current moment and online update the neural network.

Based on the neural network model, the braking model may be approximated, and the control quantity is determined based on the approximated braking model and the acceleration error, such that the control quantity may be adjusted adaptively, and a control objective that the acceleration error approaches 0 is achieved; that is, the real acceleration and the desired acceleration are guaranteed to be basically kept consistent, thereby guaranteeing the driving stability, and avoiding situations, such as emergency braking, or the like.

The neural network model at the previous moment is updated based on the filtering error, such that the model may be updated online and is not required to be trained offline.

By updating the second parameter while the first parameter is kept unchanged, the neural network may be updated, precision of the neural network is guaranteed, and a calculation amount is reduced.

504: controlling the driving behavior of the vehicle based on the control quantity at the current moment to obtain the real state quantity at the current moment.

After the adaptive control module determines control quantity u at the current moment, u may be input into the chassis system, and the chassis system controls the driving behavior of the vehicle based on control quantity u, for example, performs the braking operation based on control quantity u. Correspondingly, after the chassis system performs the braking operation, the real state quantity at the current moment, for example, real acceleration acc_real, may be output.

After obtained, the real state quantity at the current moment may be preserved, so as to be used in a subsequent process; for example, the real state quantity at the current moment may be used to calculate a state quantity error at a next moment.

As mentioned above, according to the theoretical proof, based on the above-mentioned control law and update law, the control objective of $$\lim_{t \to \infty} x_1 = 0$$

may be achieved.

Therefore, based on the above control, the real state quantity may coincide with the desired state quantity as far as possible.

For example, the desired state quantity is obtained based on MPC; for the MPC, the desired state quantity is kept as consistent as possible with the reference signal, and for this reason, in conjunction with the MPC, the real state quantity in this embodiment may be kept as consistent as possible with the reference signal.

Figure 7:
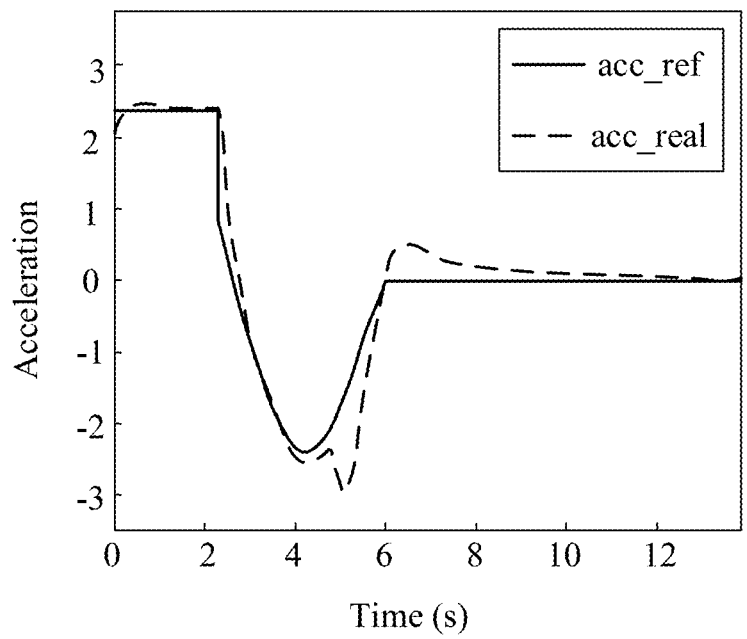
FIG. 7 is a schematic diagram of a control effect comparison between the related art and a sixth embodiment of the present disclosure.
Figure 7:
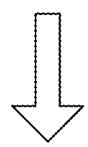
Figure 7:
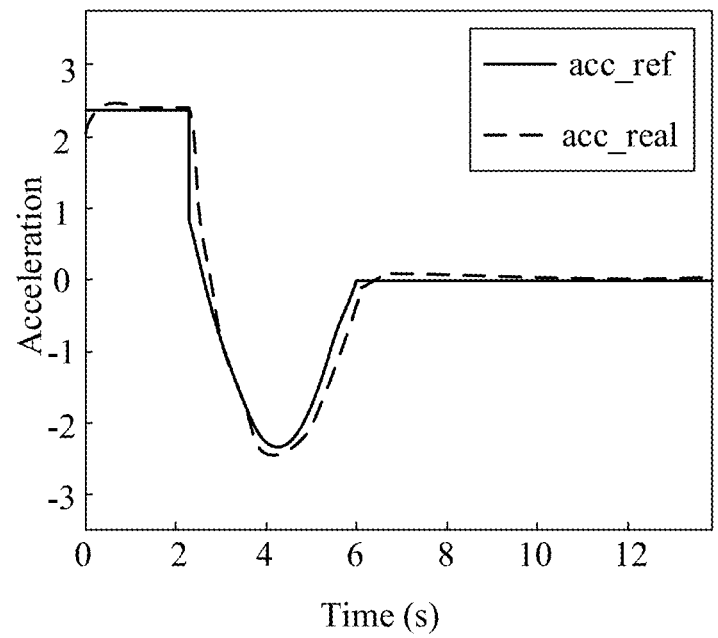

Assuming that the real state quantity is represented by real acceleration acc_real, and the reference signal is represented by reference acceleration acc_ref, as shown on the upper side of FIG. 7, in the related art, since closed loop processing is not performed on the acceleration, the real acceleration fluctuates approximately between the 4th second and the 8th second.

In this embodiment, as shown on the lower side of FIG. 7, the real acceleration is always basically kept consistent with the reference acceleration, such that the driving stability of the vehicle may be guaranteed.

In this embodiment, for the braking model of the chassis system, the acceleration error between the desired acceleration at the current moment and the real acceleration at the previous moment of the vehicle is acquired, such that the real acceleration may be used as a feedback signal to realize an acceleration closed loop; the control quantity of the vehicle at the current moment is determined based on the acceleration error and the braking model, such that a braking model factor may be introduced when the control quantity is determined, thereby ensuring that the real state quantity is the same as the desired state quantity basically, and guaranteeing the driving stability. The neural network model is used by the braking model, and the neural network model is used to approach the braking model, and then, the control quantity may be determined based on the neural network model. The neural network model is updated based on the filtering error, such that the neural network model may be updated online and is not required to be trained offline, thus reducing the calculation amount. Therefore, with the above technical means, stable driving of the vehicle may be achieved, operations, such as emergency braking, or the like, are reduced, driving safety and user experience are guaranteed, and the vehicle control effect is improved. After experiments, an emergency-braking amplification ratio may be reduced by 50%, and for example, emergency braking amplification means that emergency braking is not necessary but in fact is performed. Different from general adaptive control, in this embodiment, a double-closed-loop control strategy combining the model predictive control and the adaptive control is used, and the adaptive control is connected to a lower layer of the model predictive control, such that switching of the braking model of a chassis is guaranteed not to influence the upper-layer model predictive control, and therefore, the upper-layer model predictive control is not required to be modified.

Figure 8:
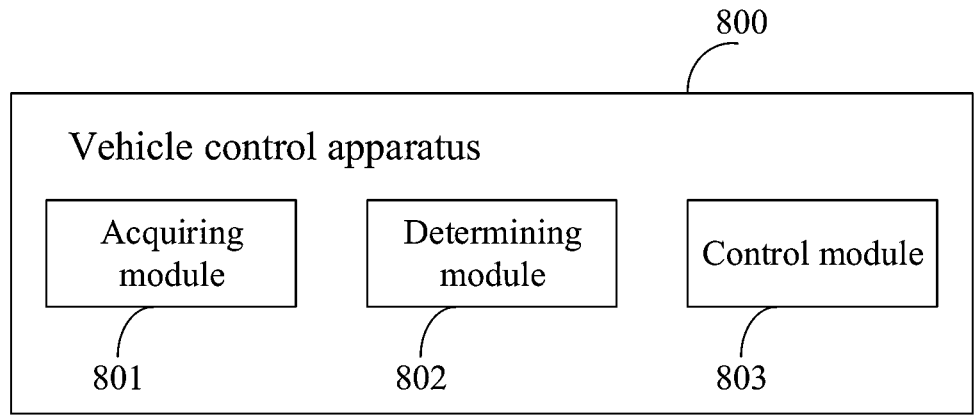
FIG. 8 is a schematic diagram according to a seventh embodiment of the present disclosure.

FIG. 8 is a schematic diagram according to a seventh embodiment of the present disclosure, and this embodiment provides a vehicle control apparatus. As shown in FIG. 8, the apparatus 800 includes: an acquiring module 801, a determining module 802 and a control module 803.

The acquiring module 801 is configured to acquire a state quantity error between a desired state quantity at a current moment and a real state quantity at a previous moment of a vehicle; the determining module 802 is configured to determine a control quantity of the vehicle at the current moment based on the state quantity error and a mapping relationship between the control quantity of the vehicle and the state quantity error; and the control module 803 is configured to control a driving behavior of the vehicle based on the control quantity at the current moment to obtain a real state quantity at the current moment.

In this embodiment, the control quantity at the current moment is determined based on the state quantity error between the desired state quantity at the current moment and the real state quantity at the previous moment and the mapping relationship between the control quantity of the vehicle and the state quantity error, and since the real state quantity at the previous moment is introduced in the determination process of the control quantity, that is, the real state quantity may be used as the feedback signal to determine the control quantity, adaptive control over the control quantity may be realized, and fluctuation of the real state quantity is avoided, thereby guaranteeing driving stability, driving safety and user experience, and improving the vehicle control effect.

In some embodiments, the mapping relationship is a neural network model, and the determining module 802 is further configured to: determine a filtering error and input data based on the state quantity error; process the input data using the neural network model at the current moment to obtain output data; and determine the control quantity of the vehicle at the current moment based on the filtering error and the output data.

Based on the neural network model, a braking model may be approximated, and the control quantity is determined based on the approximated braking model and an acceleration error, such that the control quantity may be adjusted adaptively, and a control objective that the acceleration error approaches 0 is achieved; that is, real acceleration and desired acceleration are guaranteed to be basically kept consistent, thereby guaranteeing the driving stability, and avoiding situations, such as emergency braking, or the like.

In some embodiments, the apparatus 800 further includes: an updating module configured to update the neural network model at the previous moment based on the filtering error to determine the neural network model at the current moment.

The neural network model at the previous moment is updated based on the filtering error, such that the model may be updated online and is not required to be trained offline.

In some embodiments, model parameters of the neural network model include a first parameter and a second parameter, the first parameter is a fixed value, and the second parameter is an updatable parameter; the updating module is further configured to: update the second parameter at the previous moment based on the filtering error to determine the second parameter at the current moment.

By updating the second parameter while the first parameter is kept unchanged, the neural network may be updated, precision of the neural network is guaranteed, and a calculation amount is reduced.

In some embodiments, the apparatus 800 further includes: a predicting module configured to obtain the desired state quantity of the vehicle at the current moment based on model prediction control MPC, the desired state quantity at the current moment being used for determining the state quantity error.

Different from general adaptive control, in this embodiment, a double-closed-loop control strategy combining the model predictive control and the adaptive control is used, and the adaptive control is connected to a lower layer of the model predictive control, such that switching of the braking model of a chassis is guaranteed not to influence the upper-layer model predictive control, and therefore, the upper-layer model predictive control is not required to be modified.

It may be understood that in the embodiments of the present disclosure, mutual reference may be made to the same or similar contents in different embodiments.

It may be understood that "first", "second", or the like, in the embodiments of the present disclosure are only for distinguishing and do not represent an importance degree, a sequential order, or the like.

In the technical solution of the present disclosure, the collection, storage, usage, processing, transmission, provision, disclosure, or the like, of involved user personal information are in compliance with relevant laws and regulations, and do not violate public order and good customs.

According to the embodiment of the present disclosure, there are also provided an electronic device, a readable storage medium and a computer program product.

Figure 9:
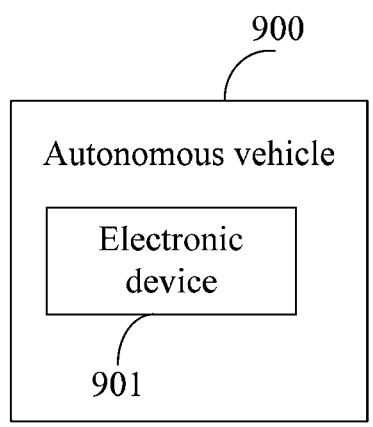
FIG. 9 is a schematic diagram according to an eighth embodiment of the present disclosure.

The embodiment of the present disclosure further provides an autonomous vehicle, and as shown in FIG. 9, the autonomous vehicle 900 includes an electronic device 901. For the description of the electronic device, reference may be made to the following embodiment.

Figure 10:
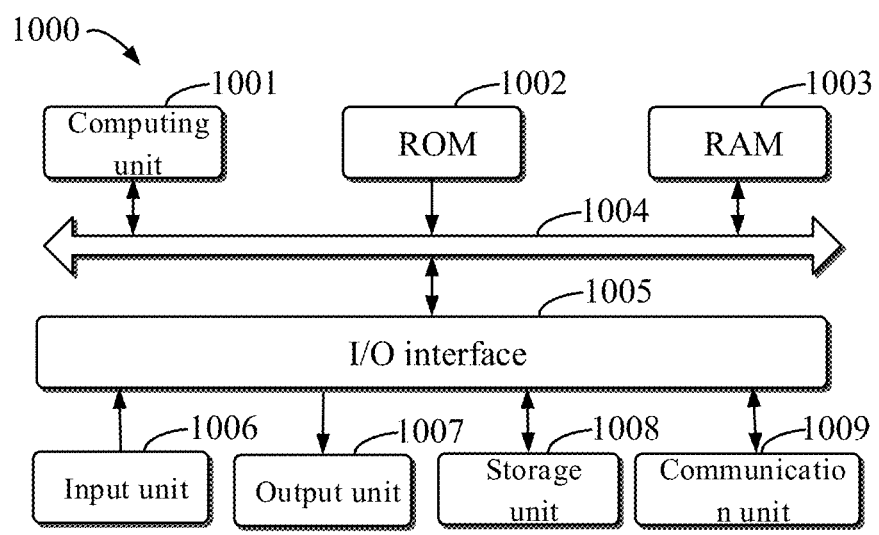
FIG. 10 is a schematic diagram of an electronic device configured to implement a vehicle control method according to the embodiment of the present disclosure.

FIG. 10 shows a schematic block diagram of an exemplary electronic device 1000 which may be configured to implement the embodiment of the present disclosure. The electronic device is intended to represent various forms of digital computers, such as laptop computers, desktop computers, workstations, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 10, the electronic device 1000 includes a computing unit 1001 which may perform various appropriate actions and processing operations according to a computer program stored in a read only memory (ROM)

1002 or a computer program loaded from a storage unit 1008 into a random access memory (RAM) 1003. Various programs and data necessary for the operation of the electronic device 1000 may be also stored in the RAM 1003. The computing unit 1001, the ROM 1002, and the RAM 1003 are connected with one other through a bus 1004. An input/output (I/O) interface 1005 is also connected to the bus 1004.

The plural components in the electronic device 1000 are connected to the I/O interface 1005, and include: an input unit 1006, such as a keyboard, a mouse, or the like; an output unit 1007, such as various types of displays, speakers, or the like; the storage unit 1008, such as a magnetic disk, an optical disk, or the like; and a communication unit 1009, such as a network card, a modem, a wireless communication transceiver, or the like. The communication unit 1009 allows the electronic device 1000 to exchange information/data with other devices through a computer network, such as the Internet, and/or various telecommunication networks.

The computing unit 1001 may be a variety of general and/or special purpose processing components with processing and computing capabilities. Some examples of the computing unit 1001 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 1001 performs the methods and processing operations described above, such as the vehicle control method. For example, in some embodiments, the vehicle control method may be implemented as a computer software program tangibly contained in a machine readable medium, such as the storage unit 1008. In some embodiments, part or all of the computer program may be loaded and/or installed into the electronic device 1000 via the ROM 1002 and/or the communication unit 1009. When the computer program is loaded into the RAM 1003 and executed by the computing unit 1001, one or more steps of the vehicle control method described above may be performed. Alternatively, in other embodiments, the computing unit 1001 may be configured to perform the vehicle control method by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable map data collection apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A vehicle control method, comprising:
   acquiring, by an adaptive control module, an acceleration error between a desired acceleration at a current moment and a real acceleration at a previous moment of a vehicle, wherein the real acceleration at the previous moment is output by a chassis system of the vehicle, the desired acceleration at the current moment is obtained by the vehicle controller according to a reference signal and the real acceleration at the previous moment and output by the vehicle controller;
   determining, by the adaptive control module, a control quantity of the vehicle at the current moment based on the acceleration error and a mapping relationship between the control quantity of the vehicle and the acceleration error, and outputting the control quantity of the vehicle at the current moment to the chassis system; and
   controlling, by the chassis system, the driving behavior of the vehicle based on the control quantity at the current moment to obtain the real acceleration at the current moment,
   wherein the mapping relationship is a neural network model, and the determining the control quantity of the vehicle at the current moment based on the acceleration error and the mapping relationship between the control quantity of the vehicle and the acceleration error comprises:
      determining a filtering error and input data based on the acceleration error;
      processing the input data using the neural network model at the current moment to obtain output data; and
      determining the control quantity of the vehicle at the current moment based on the filtering error and the output data;
   updating the neural network model at the previous moment based on the filtering error to determine the neural network model at the current moment, wherein model parameters of the neural network model comprise a first parameter and a second parameter, the first parameter is a fixed value, and the second parameter is an updatable parameter; and the updating the neural network model at the previous moment based on the filtering error to determine the neural network model at the current moment comprises:
      updating the second parameter at the previous moment based on the filtering error to determine the second parameter at the current moment.

2. The method according to claim 1, further comprising:
   obtaining the desired acceleration of the vehicle at the current moment based on model prediction control MPC, the desired acceleration at the current moment being used for determining the acceleration error.

3. An electronic device, comprising:
   at least one processor; and
   a memory connected with the at least one processor communicatively;
   wherein the memory stores instructions executable by the at least one processor to cause the at least one processor to perform a vehicle control method comprising:
   acquiring, by an adaptive control module, an acceleration error between a desired acceleration at a current moment and a real acceleration at a previous moment of a vehicle, wherein the real acceleration at the previous moment is output by a chassis system of the vehicle, the desired acceleration at the current moment is obtained by the vehicle controller according to a reference signal and the real acceleration at the previous moment and output by the vehicle controller;
   determining, by the adaptive control module, a control quantity of the vehicle at the current moment based on the acceleration error and a mapping relationship between the control quantity of the vehicle and the acceleration error, and outputting the control quantity of the vehicle at the current moment to the chassis system; and
   controlling, by the chassis system, the driving behavior of the vehicle based on the control quantity at the current moment to obtain the real acceleration at the current moment,
   wherein the mapping relationship is a neural network model, and the determining the control quantity of the vehicle at the current moment based on the acceleration error and the mapping relationship between the control quantity of the vehicle and the acceleration error comprises:
      determining a filtering error and input data based on the acceleration error;
      processing the input data using the neural network model at the current moment to obtain output data; and
      determining the control quantity of the vehicle at the current moment based on the filtering error and the output data;
   updating the neural network model at the previous moment based on the filtering error to determine the neural network model at the current moment, wherein model parameters of the neural network model comprise a first parameter and a second parameter, the first parameter is a fixed value, and the second parameter is an updatable parameter; and the updating the neural network model at the previous moment based on the filtering error to determine the neural network model at the current moment comprises:
      updating the second parameter at the previous moment based on the filtering error to determine the second parameter at the current moment.

4. The electronic device according to claim 3, wherein the method further comprises:
   obtaining the desired acceleration of the vehicle at the current moment based on model prediction control MPC, the desired acceleration at the current moment being used for determining the acceleration error.

5. An autonomous vehicle, comprising:
   a vehicle controller, configured for outputting a desired acceleration at a current moment;

a chassis system, configured for outputting a real acceleration at a previous moment; wherein the desired acceleration at the current moment is obtained by the vehicle controller according to a reference signal and the real acceleration at the previous moment;

an adaptive control module, configured for acquiring an acceleration error between the desired acceleration at the current moment and the real acceleration at the previous moment, and determining a control quantity of the vehicle at the current moment based on the acceleration error and a mapping relationship between the control quantity of the vehicle and the acceleration error, and outputting the control quantity of the vehicle to the chassis system, wherein the chassis system controls the driving behavior of the vehicle based on the control quantity at the current moment to obtain the real acceleration at the current moment, wherein the mapping relationship is a neural network model, and the adaptive control module is specifically configured for:

determining a filtering error and input data based on the acceleration error;

processing the input data using the neural network model at the current moment to obtain output data; and determining the control quantity of the vehicle at the current moment based on the filtering error and the output data, wherein the adaptive control module is further configured for:

updating the neural network model at the previous moment based on the filtering error to determine the neural network model at the current moment, wherein model parameters of the neural network model comprise a first parameter and a second parameter, the first parameter is a fixed value, and the second parameter is an updatable parameter; and the updating the neural network model at the previous moment based on the filtering error to determine the neural network model at the current moment comprises: updating the second parameter at the previous moment based on the filtering error to determine the second parameter at the current moment.

* * * * *